United States Patent [19]

Suzuki

[11] Patent Number: 5,987,616
[45] Date of Patent: Nov. 16, 1999

[54] SEMICONDUCTOR DEVICE

[75] Inventor: Hiroaki Suzuki, Tokyo, Japan

[73] Assignee: Mitsubishi Denki Kabushiki Kaisha, Tokyo, Japan

[21] Appl. No.: 08/936,627

[22] Filed: Sep. 24, 1997

[30] Foreign Application Priority Data

May 23, 1997 [JP] Japan .................................. 9-134181

[51] Int. Cl.$^6$ .............................. G06F 1/32; G06F 11/22; G06F 9/30
[52] U.S. Cl. ............................ 713/320; 713/324; 712/43
[58] Field of Search ....................... 395/800.17, 800.35, 395/800.01, 381, 561, 800.36, 384, 750.06, 750.3, 842; 381/312; 702/65; 708/523, 620; 712/43, 208; 710/14, 74; 713/320, 300, 321, 324, 322

[56] References Cited

U.S. PATENT DOCUMENTS 5,203,003  4/1993  Donner ............................. 364/DIG. 1
5,742,781  4/1998  Bajwa ................................. 385/384

FOREIGN PATENT DOCUMENTS 32 41 786 C2  1/1991  Germany .
59-62933      4/1984  Japan .
8-271584     10/1996  Japan .

OTHER PUBLICATIONS

S. Shigematsu et al., "Power Management Technique for 1–V LSIs using Embedded Processor," IEEE 1996 Custom Integrated Circuits Conference, 96CH35886, May 1996, cover page and pp. 111–114.

*Primary Examiner*—Daniel H. Pan
*Attorney, Agent, or Firm*—Burns, Doane, Swecker & Mathis, LLP

[57] ABSTRACT

In order to reduce a leak current, a processor core unit decodes an instruction fetched by an instruction fetch portion and turns off a leak cut switch for an unused function block of function blocks according to the result of decoding, whereby the supply of power to the corresponding function block is cut off.

6 Claims, 7 Drawing Sheets

SEMICONDUCTOR DEVICE

BACKGROUND OF THE INVENTION

1. Field of the Invention

The present invention relates to a semiconductor device, and particularly to a semiconductor device having a configuration for cutting a leak current.

2. Description of the Prior Art

A source voltage used for a CMOSLSI has heretofore been reduced to result in less power consumption. This tendency is expected to continue from now on. Maintaining performance even under a low source voltage requires a mechanism to sufficiently ensure a drain current flowing in the drain of a transistor and reduce losses produced due to a threshold voltage thereof. Namely, it is also necessary to reduce the threshold voltage of a MOS transistor along with the reduction in the source voltage. However, since a subthreshold current that flows under a voltage below the threshold voltage increases as the threshold voltage decreases, an on-standby leak current becomes large.

Figure 7:
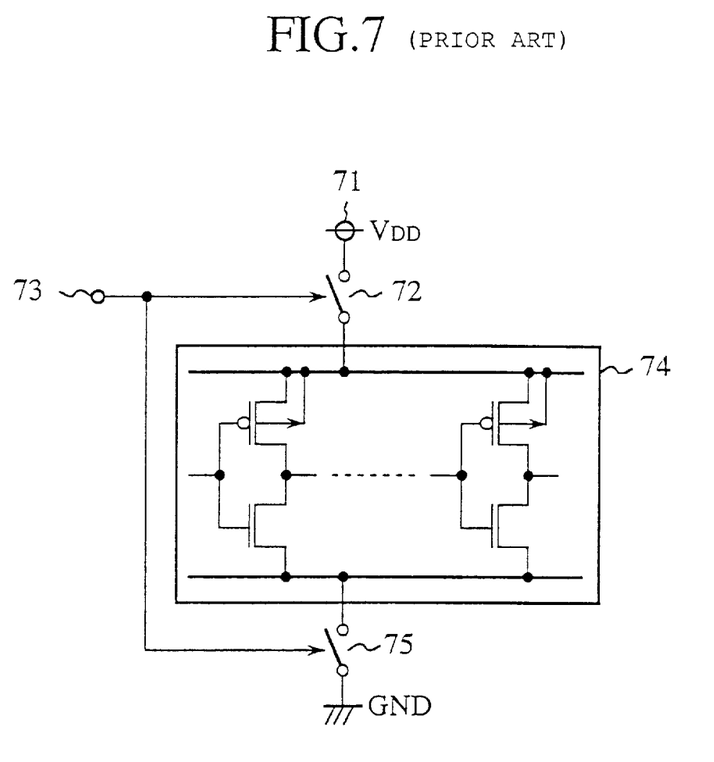
FIG. 7 is a circuit diagram showing a circuit configuration of a conventional semiconductor device.

A circuit configuration provided with leak cut switches shown in FIG. 7 has been proposed as a measure for cutting this leak current. In FIG. 7, reference numeral 71 indicates a power terminal employed in this semiconductor device, to which a source voltage VDD is applied. Reference numerals 72, 75, 73 and 74 indicate a leak cut switch provided on the power side, a leak cut switch provided on the earth side, a control terminal for applying a control voltage to the leak cut switches 72 and 75, and a CMOS circuit respectively.

The operation of the present circuit configuration will next be described.

When it is unnecessary to supply power to the CMOS circuit 74, a control signal for turning off the leak cut switches 72 and 75 is applied to the control terminal 73 so as to turn off the leak cut switches 72 and 75, whereby the source voltage VDD supplied to the power terminal 71 is prevented from being supplied to the CMOS circuit 74. It is thus possible to prevent a leak current from being developed in the CMOS circuit 74.

Figure 8:
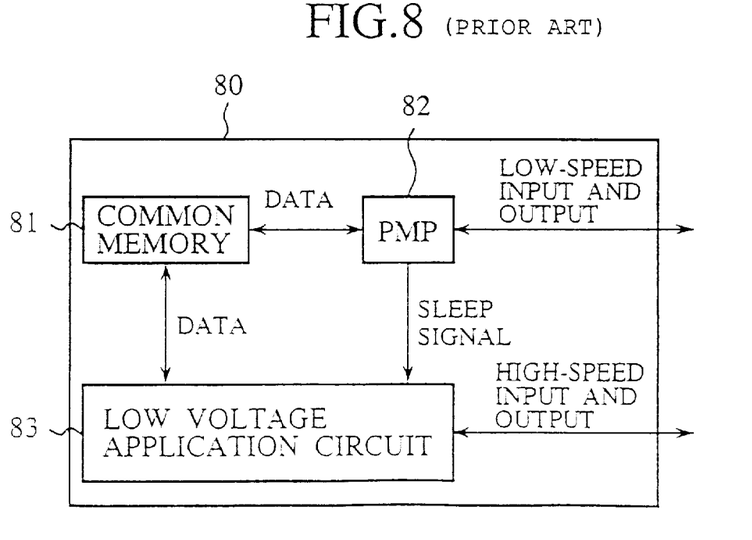
FIG. 8 is a block diagram depicting a configuration of a conventional semiconductor device equipped with a device for controlling timing.

The implementation of this leak current cut-off system suffers a problem as to when and which each of the leak cut switches 72 and 75 should be activated. FIG. 8 is a block diagram showing a conventional semiconductor device provided with a device for controlling the timing. The semiconductor device has been disclosed in FIG. 3 of a paper "Power Management Technique for 1-VLSIs using Embedded Processor" by S. Shigematsu, S. Mutoh and Y. Matsuya, IEEE 1996 Custom Integrated Circuits Conf., pp.111–114, 1996.

Figure 9:
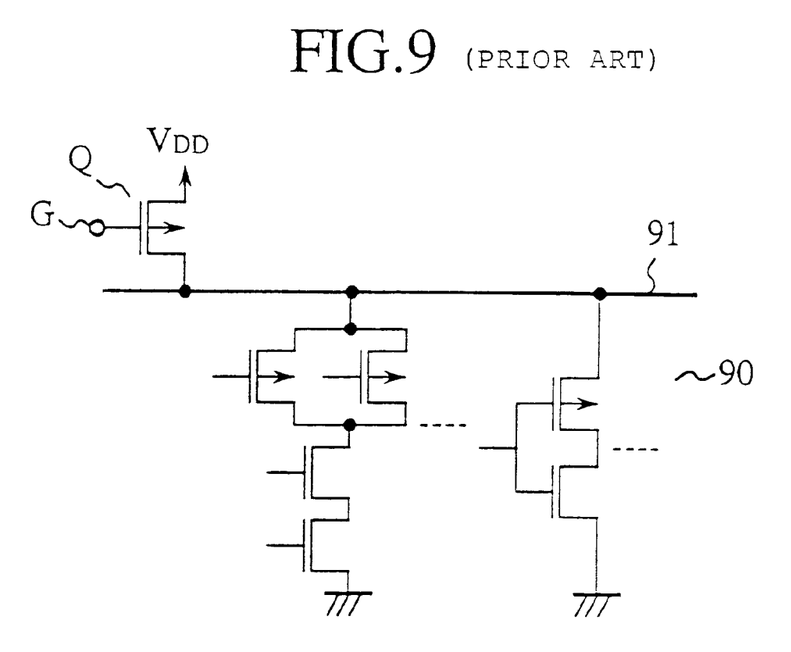
FIG. 9 is a circuit diagram illustrating a part of an internal configuration of a low voltage application circuit shown in FIG. 8.
Figure 10:
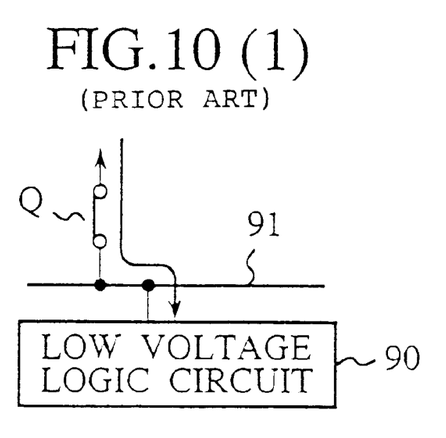

Referring to FIG. 8, reference numerals 80, 81, 82 and 83 indicate a semiconductor device, a common memory, a power management processor for generating a signal for controlling timing provided to operate each leak cut switch, and a low voltage application circuit activated at a low voltage, which is composed of CMOSs low in threshold voltage but large in leak current when turned off. FIG. 9 is a circuit diagram (corresponding to FIG. 1 in the paper) showing a part of an internal configuration of the low voltage application circuit 83. In the drawing, symbols Q and G indicate a transistor that constitutes a leak cut switch, and a gate terminal of the transistor Q, respectively. Reference numerals 90 and 91 indicate a low voltage logic circuit and a virtual source line respectively. Since the transistor Q is activated as the leak cut switch, a transistor high in threshold voltage but reduced in leak current is used as the transistor Q.

The operation will next be described.

As shown in FIGS. 10(1) and 10(2) corresponding to FIG. 2 in the paper described above, an L-level control signal is supplied to the gate terminal G from the power management processor 82 so as to turn on the transistor Q upon activating the low voltage logic circuit 90, whereby a source voltage VDD is applied to the virtual source line 91 to supply an operating current to the low voltage logic circuit 90 (see FIG. 10(1)). On the other hand, when the low voltage logic circuit 90 is put to sleep, an H-level control signal is supplied to the gate terminal G from the power management processor 82 so as to turn off the transistor Q, whereby the leak current is cut together with the operating current of the low voltage logic circuit 90 (see FIG. 10(2)). The power management processor 82 generates a control signal for turning on and off the transistor Q, based on a processing request issued from the outside.

Since data stored in a memory of the low voltage application circuit 83 is destroyed when the transistor Q is turned off, the data held in the memory of the low voltage application circuit 83 is saved on the common memory 81 prior to the turning off of the transistor Q. Thus, the power management processor 82 performs even load/store control on the common memory 81.

Since the conventional semiconductor device is constructed as described above, a problem arises in that special hardware corresponding to a power management processor must be additionally provided for each IC chip, so that area overhead becomes large.

SUMMARY OF THE INVENTION

With the foregoing in view, it is therefore a principal object of the present invention to provide a semiconductor device capable of cutting a leak current with efficiency without the use of special hardware corresponding to a power management processor.

It is a subsidiary object of the present invention to provide a semiconductor device such as an LSI activated a high-speed clock, which is capable of cutting a leak current while following its speed.

It is a subsidiary object of the present invention to provide a semiconductor device capable of cutting a leak current even when an instruction has stalled due to a cache miss or the like.

According to a first aspect of the present invention, for achieving the above objects, there is provided a semiconductor device comprising a processor core unit which includes an instruction fetch portion for fetching both or one of an instruction and data, a decoder for decoding an instruction fetched by the instruction fetch portion, a plurality of function blocks divided by processing functions, leak cut switches for respectively cutting off the supply of power to the function blocks and a power management unit for analyzing both or one of the instruction and the data and generating a control signal for turning off the leak cut switch for a non-used function block of the plurality of function blocks. Thus, an advantageous effect can be obtained in that the leak current can be cut with efficiency without the use of a power management processor.

According to a second aspect of the present invention, there is provided a semiconductor device wherein a decoder is divided into at least a predecoder for classifying instructions and allocating function blocks for processing instructions and local decoders for respectively decoding the instructions allocated to the individual function blocks, leak cut switches for cutting off the supply of power to the local decoders are provided every local decoders, and a power management unit generates a control signal for turning off the leak cut switch for a non-used local decoder of the local decoders. Thus, an advantageous effect can be brought about in that the leak current can be cut with further efficiency.

According to a third aspect of the present invention, there is provided a semiconductor device wherein an instruction queue unit for temporarily retaining each of instructions is further provided in a processor core unit and a power management unit analyzes the instruction prior to the execution of the instruction and previously generates a control signal for turning off a leak cut switch for a non-used function block of function blocks. Thus, an LSI activated by a high-speed clock can also obtain an advantageous effect in that the leak current can be cut while following its speed.

According to a fourth aspect of the present invention, there is provided a semiconductor device wherein a power management unit generates control signals for turning off leak cut switches for all the circuit units other than an instruction fetch portion of a processor core unit when the instruction is defetched by the instruction fetch portion. Thus, an advantageous effect can be obtained in that the leak current can be cut even when the instruction has stalled due to a cache miss or the like.

According to a fifth aspect of the present invention, there is provided a semiconductor device wherein input/output devices of a processor core unit are classified into at least two blocks for upper-order and lower-order bits, leak cut switches are provided for the classified input/output devices for the upper-order and lower-order bits respectively, and a power management unit generates control signals for turning off the leak cut switches used for the input/output devices when the input/output devices are not in use. Thus, an advantageous effect can be obtained in that the leak current can be cut with further efficiency.

According to a sixth aspect of the present invention, there is provided a semiconductor device wherein bus driver circuits of a processor core unit are classified into at least a bus driver circuit for an upper-order bit bus and a bus driver circuit for a lower-order bit bus, leak cut switches are provided for the classified bus driver circuits for the upper-order and lower-order bit buses respectively, and a power management unit generates control signals for turning off the leak cut switches used for the bus driver circuits when the upper-order and lower-order bit buses are not in use. Thus, an advantageous effect can be obtained in that the leak current can be cut with further efficiency.

Typical ones of various inventions of the present application have been shown in brief. However, the various inventions of the present application and specific configurations of theses inventions will be understood from the following description.

BRIEF DESCRIPTION OF THE DRAWINGS

Other objects and advantages of the present invention will be more completely understood from the following detailed description, taken in conjunction with the accompanying drawings wherein:

FIGS. 10(1) and 10(2) are respectively diagrams showing states of the leak cut switches at the time that the low voltage logic circuits shown in FIG. 9 are activated and deactivated.

DETAILED DESCRIPTION OF THE PREFERRED EMBODIMENTS

Preferred embodiments of the present invention will hereinafter be described in detail with reference to the accompanying drawings.

[First Embodiment]

Figure 1:
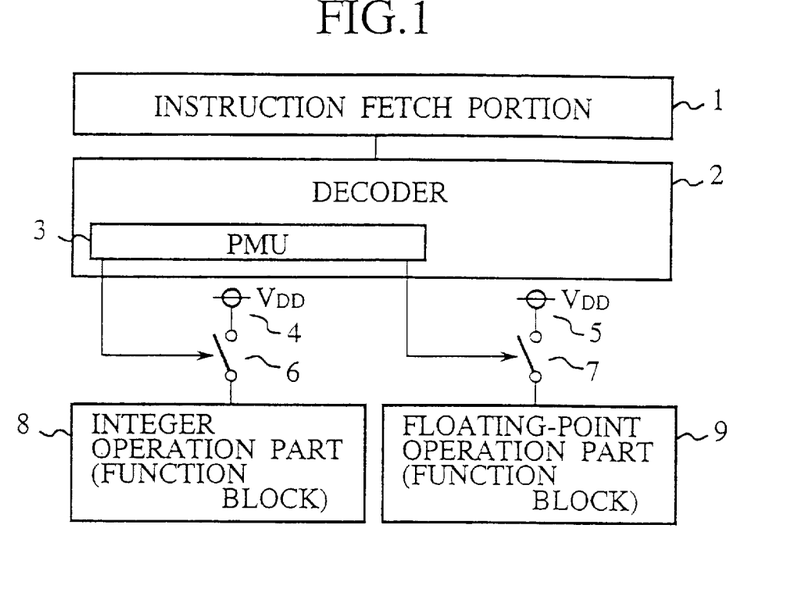
FIG. 1 is a block diagram showing a configuration of a processor core unit of a semiconductor device according to a first embodiment of the present invention.

FIG. 1 is a block diagram showing a configuration of a processor core unit of a semiconductor device according to a first embodiment of the present invention. The semiconductor device according to the first embodiment is an LSI activated under instruction control, such as a logic LSI equipped with a microprocessor and a processor core. Since the execution and/or non-execution of respective processing functions such as an arithmetic processing function, a memory access function, a branching function, etc. are determined according to an instruction, such an LSI can make a decision as to the execution and/or non-execution of the individual functions when the instruction is decoded.

Referring to FIG. 1, reference numeral 1 indicates an instruction fetch portion for fetching an instruction from a memory such as an unillustrated ROM, an unillustrated RAM, or the like. Reference numeral 2 indicates a decoder for decoding the instruction fetched by the instruction fetch portion 1. Reference numeral 3 indicates a power management unit (hereinafter abbreviated as SPMU) for determining based on the instruction fetched by the instruction fetch portion 1 which function block should be activated and thereby outputting a control signal for each leak cut switch. Reference numeral 8 indicates an integer operation part (function block). Reference numeral 4 indicates a power terminal for supplying a source voltage VDD to the integer operation part 8. Reference numeral 6 indicates a leak cut switch used for the integer operation part 8. Reference numeral 9 indicates a floating-point operation part (function block). Reference numeral 5 indicates a power terminal for supplying the source voltage VDD to the floating-point operation part 9. Reference numeral 7 indicates a leak cut switch used for the floating-point operation part 9.

In the first embodiment as shown in FIG. 1, the processing functions such as the arithmetic processing function, the memory access function, the branching function, etc. are blocked every functions (only the integer operation part 8 and the floating-point operation part 9 are illustrated in the drawing). The leak cut switches are provided which turn on and off the supply of the source voltage VDD every function blocks.

The operation of the semiconductor device will next be described.

The instruction fetch portion 1 fetches an instruction from the memory. The decoder 2 decodes the instruction indicative of which processing is to be done. At this time, places to store reference addresses for input data and resultant data, or functions (addition, logical operation, data transfer, etc.) are analyzed.

The PMU 3 analyzes which block should be activated or deactivated upon decoding the instruction by the decoder 2. Further, the PMU 3 generates control signals for turning on and off the leak cut switches 6 and 7 for the respective function blocks and supplies them to the individual leak cut switches 6 and 7. When the issued instruction is, for example, an integer addition or logical operation instruction, the PMU 3 turns off the leak cut switch 7 for the floating-point operation part 9 so as to cut a leak current of the floating-point operation part 9. If a floating-point instruction is issued in reverse, then the PMU 3 turns off the leak cut switch 6 for the integer operation part 8 so as to cut a leak current of the integer operation part 8.

According to the first embodiment as described above, an advantageous effect can be obtained in that the leak currents can be finely cut every function blocks and the time required to cut the leak current for each function block becomes long, whereby the semiconductor device can be reduced in power consumption.

[Second Embodiment]

Figure 2:
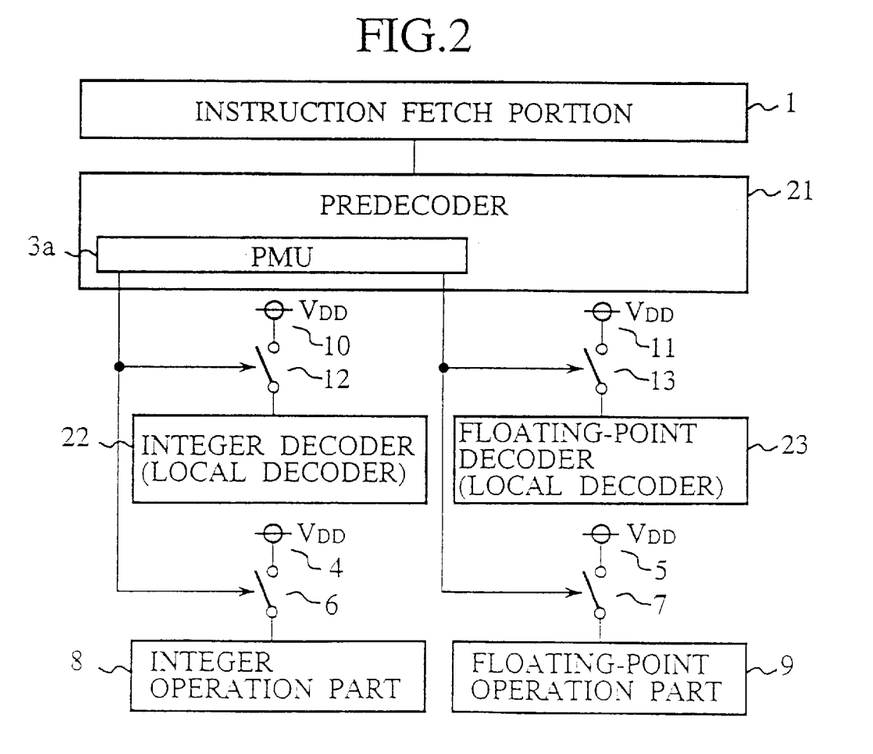
FIG. 2 is a block diagram illustrating a configuration of a processor core unit of a semiconductor device according to a second embodiment of the present invention.

FIG. 2 is a block diagram showing a configuration of a processor core unit of a semiconductor device according to a second embodiment of the present invention. In FIG. 2, the same elements of structure as those employed in the first embodiment shown in FIG. 1 are identified by like reference numerals and their description will therefore be omitted.

The type of function block is normally smaller than the number of instructions overwhelmingly. Thus, the number of times the function block is turned on and off, is fewer than the number of instruction processing steps overwhelmingly upon the analysis of each instruction. This means that decoding for source control is simple as compared with instruction decoding. In the second embodiment, circuits for a decode unit are set to a two-level hierarchy using the fact referred to above and each of leak cut switches is turned off when some of the decoder circuits is also unnecessary. Namely, in the present embodiment, a decoder is divided into a predecoder for roughly classifying instructions and arranging or allocating the instructions every function blocks, and local decoders for respectively performing decoding inherent in the function blocks according to the individual function blocks.

Referring to FIG. 2, reference numeral 3a indicates a PMU for determining, based on an instruction fetched by an instruction fetch portion 1, which function block needs to operate and outputting a control signal for each leak cut switch. Further, the PMU outputs even a control signal for turning off a leak cut switch for a local decoder not used in the present embodiment. Reference numeral 21 indicates a predecoder for making a decision as to only an integer-system instruction or a floating-point system instruction and transmitting it to the corresponding function block. Reference numeral 22 indicates an integer decoder (local decoder) for decoding an instruction for an integer operation part 8. Reference numeral 23 indicates a floating-point decoder (local decoder) for decoding an instruction for a floating-point operation part 9. Incidentally, reference numerals 10 and 11 indicate power terminals for respectively supplying a source voltage VDD to the integer decoder 22 and the floating-point decoder 23. Reference numerals 12 and 13 indicate leak cut switches provided for the integer decoder 22 and the floating-point decoder 23 respectively.

The operation of the present embodiment will next be described.

The predecoder 21 decodes the instruction fetched by the instruction fetch portion 1 to make a decision as to only the integer-system instruction or the floating-point system instruction and transmits the decoded instruction to the corresponding function block. When the instruction corresponds to the integer instruction, the integer decoder 22 receives it therein and decodes processing to be executed so as to activate the integer operation part 8. During that time, the floating-point system serves so as to turn off both leak cut switches 13 and 7 for the floating-point decoder 23 and the floating-point operation part 9 to thereby cut leak currents developed in the floating-point decoder 23 and the floating-point operation part 9. When the instruction indicates the floating-point system in reverse, the floating-point decoder 23 decodes a process to be executed in response to it to thereby activate the floating-point operation part 9. During that time, the integer system turns off both leak cut switches 12 and 6 for the integer decoder 22 and the integer operation part 8 so as to cut leak currents developed in the integer decoder 22 and the integer operation part 8.

According to the second embodiment as described above, an advantageous effect can be obtained in that since the local decoders such as the integer decoder 22 and the floating-point decoder 23 or the like can be turned on and off according to the need for operations of their corresponding function blocks although the predecoder 21 must be activated if the instruction is issued, the leak currents can be cut with further efficiency as compared with the first embodiment.

[Third Embodiment]

Figure 3:
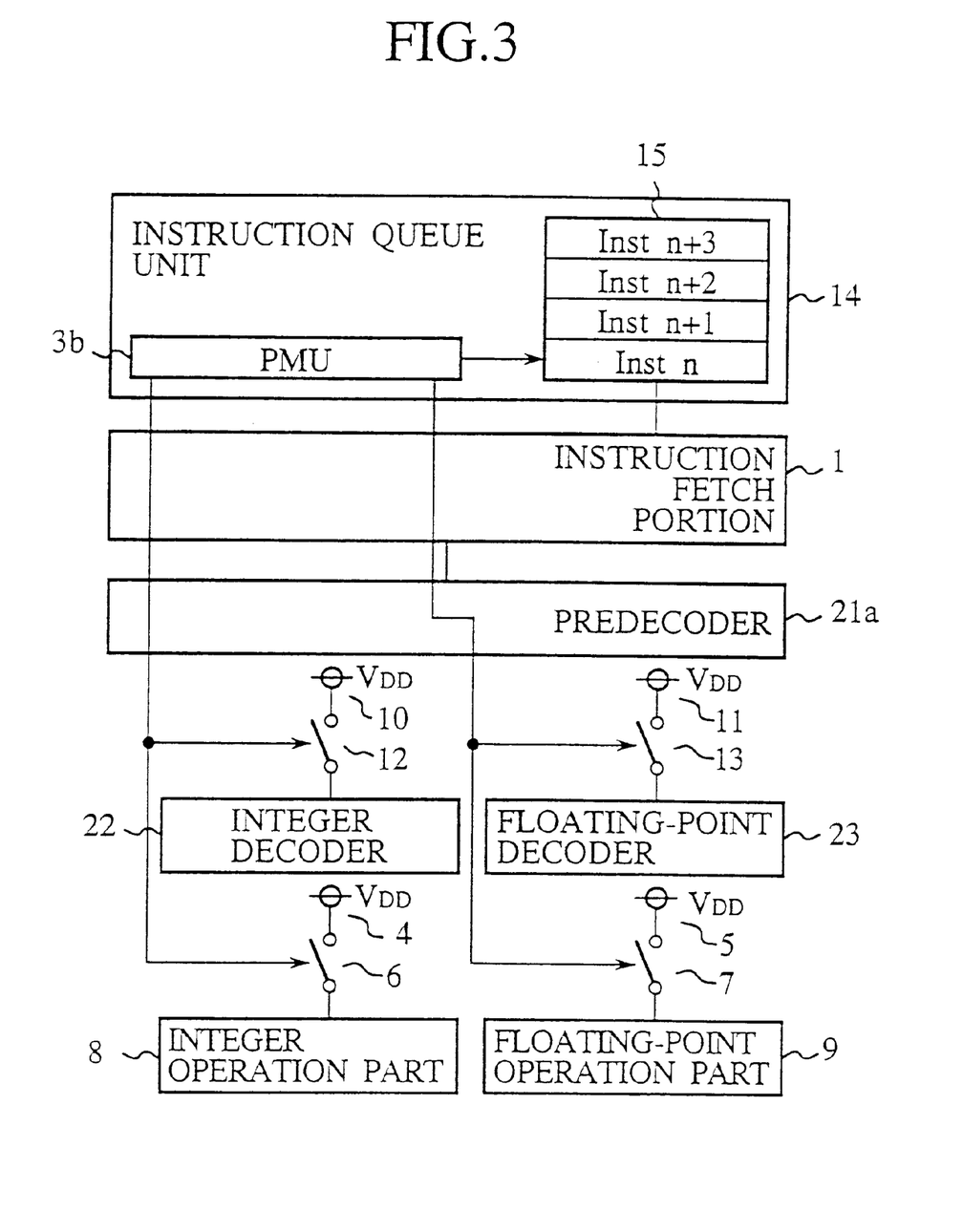
FIG. 3 is a block diagram depicting a configuration of a processor core unit of a semiconductor device according to a third embodiment of the present invention.

FIG. 3 is a block diagram showing a configuration of a processor core unit of a semiconductor device according to a third embodiment of the present invention. In FIG. 3, the same elements of structure as those employed in the second embodiment shown in FIG. 2 are identified by the same reference numerals and their description will therefore be omitted.

Referring to FIG. 3, reference numeral 14 indicates an instruction queue unit for temporarily holding each instruction fetched by an instruction fetch portion 1. Reference numeral 15 indicates each of instructions retained in the instruction queue unit 14. Reference numeral 3b indicates a PMU for analyzing an instruction 15 held in the instruction queue unit 14 to determine a function block that needs to be activated and transmitting on/off control signals to respective leak cut switches 12, 13, 6 and 7. Reference numeral 21a indicates a predecoder for making a decision as to only an integer-system instruction or a floating-point system instruction and transmitting it to the corresponding function block.

The operation of the present embodiment will next be described.

In the third embodiment, the PMU 3b in the instruction queue unit 14 analyzes an instruction 15 fetched by the instruction fetch portion 1 and held in the instruction queue unit 14 in advance before the processor core unit starts operating and generates or creates on/off control signals for leak cut switches 10, 11, 4 and 5. After the processor core unit has started operating, the PMU 3b supplies the pre-created on/off control signals to the individual leak cut switches 10, 11, 4 and 5 in suitable timing.

According to the third embodiment as described above, an advantageous effect can be obtained in that since the on/off control signals for the leak cut switches are created prior to the actual execution of instruction, the present invention can be applied even to a processor activated by a high-speed clock.

[Fourth Embodiment]

Figure 4:
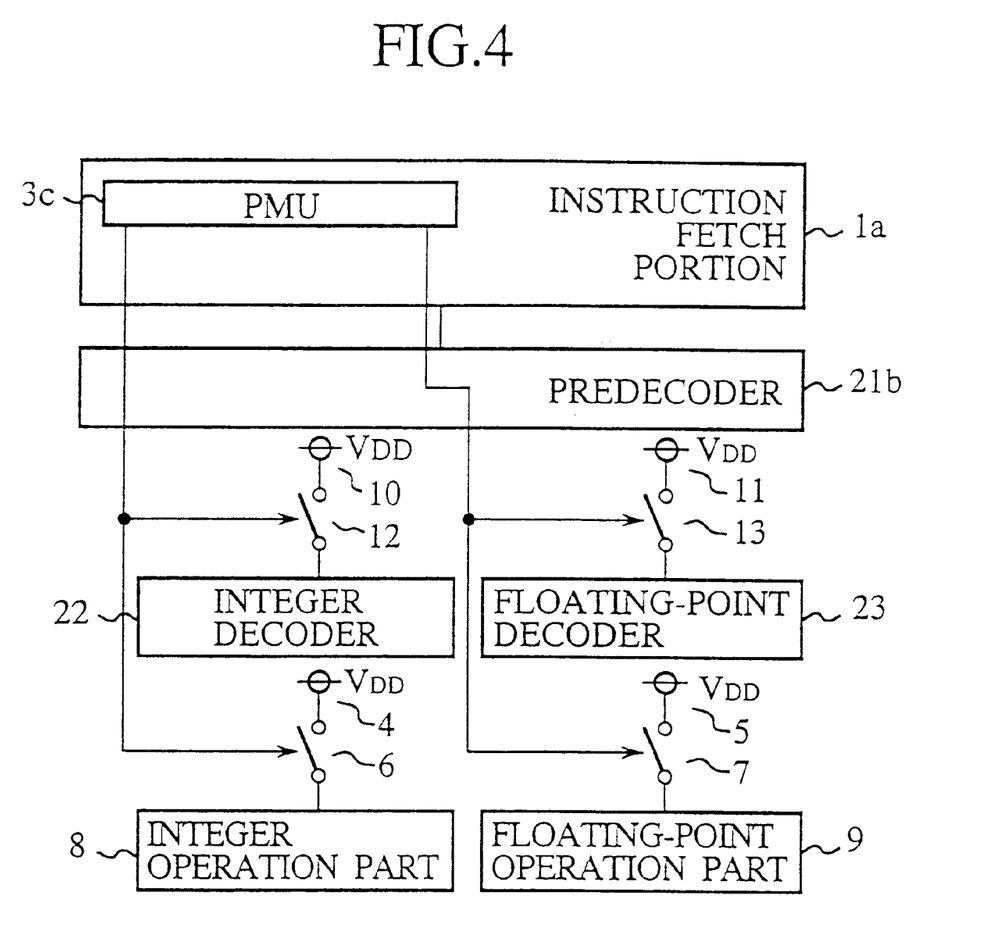
FIG. 4 is a block diagram showing a configuration of a processor core unit of a semiconductor device according to a fourth embodiment of the present invention.

FIG. 4 is a block diagram showing a configuration of a processor core unit of a semiconductor device according to a fourth embodiment of the present invention. In FIG. 4, the same elements of structure as those employed in the second and third embodiments shown in FIGS. 2 and 3 are identified by like reference numerals and their description will therefore be omitted.

Referring to FIG. 4, reference numeral 1a indicates an instruction fetch portion for fetching an instruction from a memory such as an unillustrated ROM or RAM. Reference numeral 3c indicates a PMU for determining, based on the instruction fetched by the instruction fetch portion 1a, which function block should be activated and outputting a control signal for each leak cut switch, and producing control signals for turning off leak cut switches of all the circuit units excluding the instruction fetch portion of the processor core unit when the instruction fetch portion 1a cannot fetch any instruction, i.e., when no instructions are issued. Reference numeral 21b indicates a predecoder for making a decision as to whether only an integer-system instruction or a floating-point system instruction has been given, and transmitting it to the corresponding function block. Incidentally, the predecoder 21b has a leak cut switch provided thereinside.

The operation of the present embodiment will next be described.

The PMU 3C determines, based on the instruction fetched by the instruction fetch portion 1a, which function block should be activated and generates a control signal for each leak cut switch, and generates and outputs control signals for turning off leak cut switches for all the circuit units excluding the instruction fetch portion 1a of the processor core unit including the predecoder 21b when the instruction has stalled in a state in which the instruction fetch portion 1a does not fetch the next instruction due to a cache miss or the like.

According to the fourth embodiment as described above, an advantageous effect can be obtained in that since the leak cut switches for all the circuit units other than the instruction fetch portion of the processor core unit are turned off when the instruction fetch portion does not fetch the next instruction due to the cache miss or the like, leak currents can be reduced more sufficiently.

[Fifth Embodiment]

Figure 5:
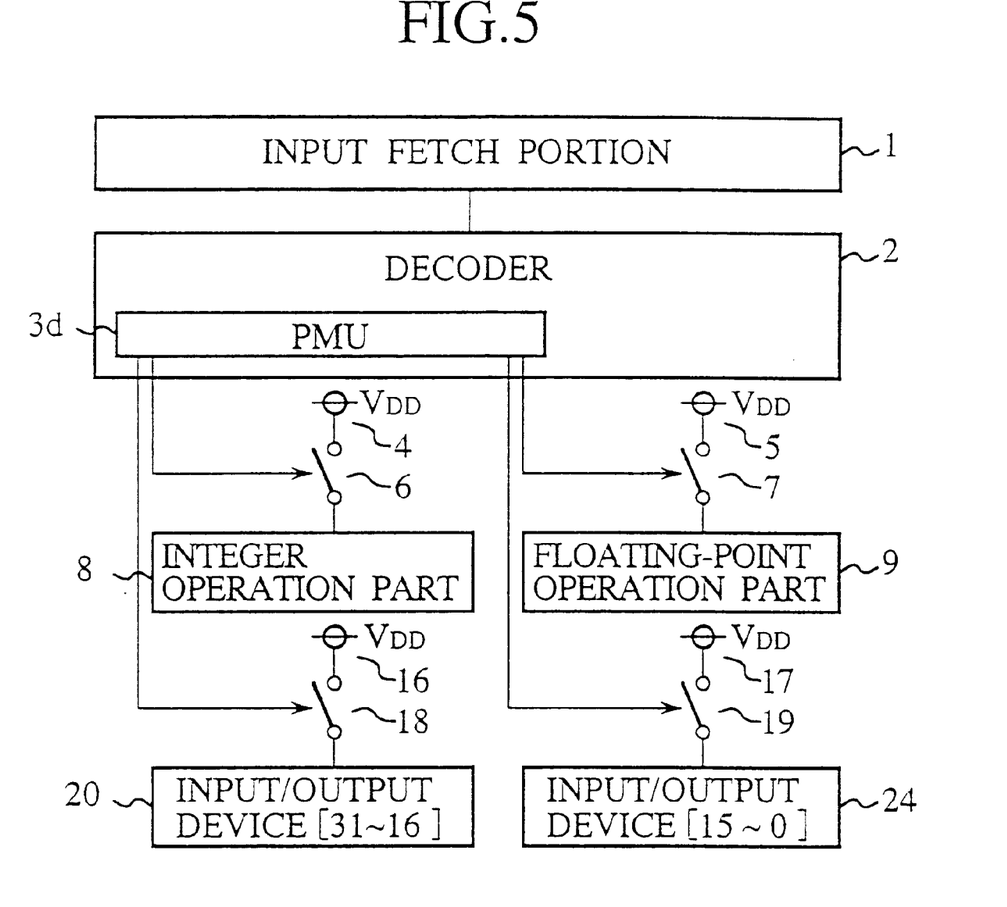
FIG. 5 is a block diagram showing a configuration of a processor core unit of a semiconductor device according to a fifth embodiment of the present invention.

FIG. 5 is a block diagram showing a configuration of a processor core unit of a semiconductor device according to a fifth embodiment of the present invention. In FIG. 5, the same elements of structure as those employed in the first embodiment shown in FIG. 1 are identified by the same reference numerals and their description will therefore be omitted.

Referring to FIG. 5, reference numeral 3d indicates a PMU for determining, based on an instruction fetched by an instruction fetch portion 1, which function block should be activated and outputting a control signal for each leak cut switch. In the fifth embodiment, the PMU supplies control signals for leak cut switches even to input/output circuits as necessary. Reference numerals 20, 16, 18, 24, 17 and 19 indicate an upper-order 16-bit input/output circuit, a power terminal for supplying a source voltage VDD to the input/output circuit 20, a leak cut switch for the input/output circuit 20, a lower-order 16-bit input/output circuit, a power terminal for supplying the source voltage VDD to the input/output circuit 24, and a leak cut switch for the input/output circuit 24, respectively.

The operation of the present embodiment will next be described.

In the fifth embodiment, the PMU 3d determines the format of data and turns off a leak cut switch for an input/output circuit corresponding to an unnecessary portion so as to avoid the supply of power to the corresponding input/output circuit. In instructions for a byte processing system and a half word processing system, the leak cut switch 18 for the upper-order 16-bit input/output circuit 20 is turned off to cut off the supply of power. When the lower-order 16-bit input/output circuit is not used, the leak cut switch 19 for the lower-order 16-bit input/output circuit 24 is turned off in the same manner as described above.

According to the fifth embodiment as described above, an advantageous effect can be obtained in that since the leak cut switch for the non-used input/output circuit is turned off, the leak current can be reduced more sufficiently.

[Sixth Embodiment]

Figure 6:
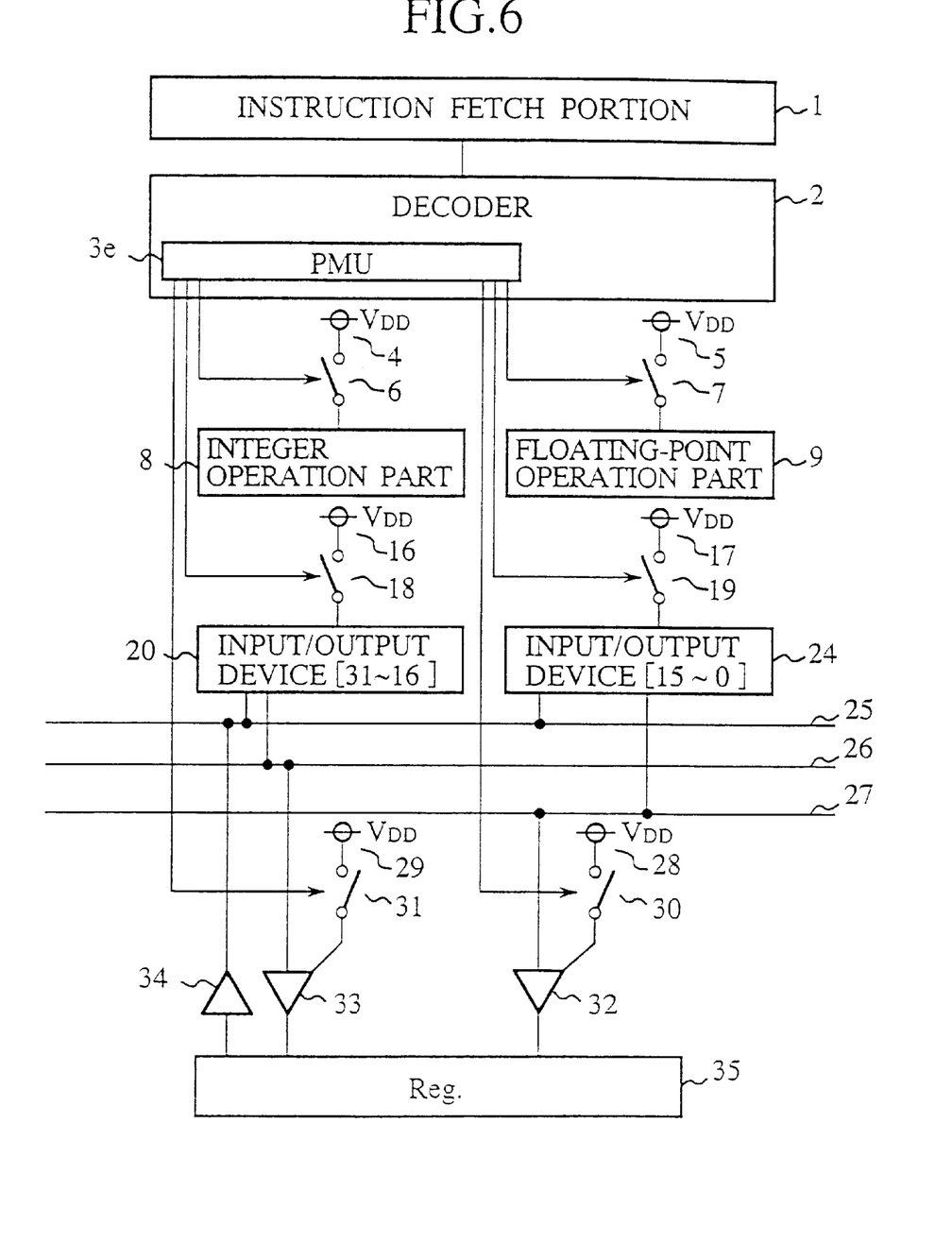
FIG. 6 is a block diagram illustrating a configuration of processor core unit of a semiconductor device according to a sixth embodiment of the present invention.

FIG. 6 is a block diagram showing a configuration of a processor core unit of a semiconductor device according to a sixth embodiment of the present invention. In FIG. 6, the same elements of structure as those employed in the fifth embodiment shown in FIG. 5 are identified by like reference numerals and their description will therefore be omitted.

Referring to FIG. 6, reference numeral 3e indicates a PMU for determining, based on an instruction fetched by an instruction fetch portion 1, which function block should be activated and outputting a control signal for each leak cut switch. In the sixth embodiment, the PMU 3e supplies control signals for leak cut switches to bus driver circuits as needed. Reference numerals 25, 26, 27, 35, 32, 33 and 34 indicate a bus for inputting data to input/output devices 20 and 24, a bus for upper-order 16-bit data outputted from the input/output device 20, a bus for lower-order 16-bit data outputted from the input/output device 24, a register for storing data therein, a bus driver circuit related to the bus 27 used for lower-order bits, a bus driver circuit related to the bus 26 used for upper-order bits, and a bus driver circuit related to the bus 25. Reference numeral 28 indicates a power terminal for supplying a source voltage VDD to the bus driver circuit 32. Reference numeral 30 indicates a leak cut switch used for the bus driver circuit 32. Reference numeral 29 indicates a power terminal for supplying the source voltage VDD to the bus driver circuit 33. Reference numeral 31 indicates a leak cut switch used for the bus driver circuit 33.

The operation of the present embodiment will next be described.

In the sixth embodiment, the PMU 3e determines the format of data and turns off even a leak cut switch for a bus driver circuit corresponding to an unnecessary portion so as to avoid the supply of power to the corresponding bus driver circuit. In instructions for a byte processing system and a half word processing system, the leak cut switch 31 for the upper-order 16-bit bus driver circuit 33 is turned off to cut off the supply of power. When the lower-order 16-bit bus driver circuit is not used, the leak cut switch 30 for the lower-order 16-bit bus driver circuit 32 is turned off in the same manner as described above.

According to the sixth embodiment as described above, an advantageous effect can be obtained in that since the leak cut switch for the non-used bus driver circuit is also turned off, the leak current can be reduced more sufficiently.

In all the embodiments described above, the leak cut switch is provided on the power terminal side of each function block. However, it is not necessarily limited to this position. It may be provided on the earth terminal side of each function block or on both the power terminal and earth terminal sides. It is needless to say that the respective embodiments may be carried out in combination.

While the present invention has been described with reference to the preferred embodiments, the description of these is made by way of illustrative example. It should be understood from these description that various modifications and changes can be made without departing from the spirit and scope of the appended claims.

What is claimed is:

1. A semiconductor device comprising:

a processor core unit, said processor core unit including, an instruction fetch portion for fetching both or one of an instruction and data;

a decoder for decoding an instruction fetched by said instruction fetch portion;

a plurality of function blocks divided by processing functions;

leak cut switches for respectively cutting off the supply of power to said function blocks, which are provided for each function block; and a power management unit for analyzing both or one of the instruction and the data and generating a control signal for turning off a respective leak cut switch of said leak switches for a non-used function block of said plurality of function blocks.

2. A semiconductor device according to claim 1, wherein said decoder is divided into at least a predecoder for classifying instructions and allocating function blocks for processing the instructions and local decoders for respectively decoding the instructions allocated to the individual function blocks, leak cut switches for cutting off the supply of power to the local decoders are provided every local decoders, and said power management unit generates a control signal for turning off the leak cut switch for a non-used local decoder of said local decoders.

3. A semiconductor device according to claim 1, wherein said processor core unit includes an instruction queue unit for temporarily retaining each of instructions and wherein said power management unit analyzes the instruction prior to the execution of the instruction and previously generates a control for turning off the leak cut switch for the non-used function block of said plurality of function blocks.

4. A semiconductor device according to claim 1, wherein said power management unit generates control signals for turning off the leak cut switches for all the circuit units other than said instruction fetch portion of said processor core unit when the instruction is defetched by said instruction fetch portion.

5. A semiconductor device according to claim 1, wherein input/output devices of said processor core unit are divided into at least two blocks for upper-order and lower-order bits, leak cut switches are provided for the divided input/output devices for the upper-order and lower-order bits respectively, and said power management unit generates control signals for turning off the leak cut switches used for said input/output devices when said input/output devices are not in use.

6. A semiconductor device according to claim 1, wherein bus driver circuits of said processor core unit are divided into at least a bus driver circuit for an upper-order bit bus and a bus driver circuit for a lower-order bit bus, leak cut switches are provided for the divided bus driver circuits for the upper-order and lower-order bit buses respectively, and said power management unit generates control signals for turning off the leak cut switches used for said bus driver circuits when said upper-order and lower-order bit buses are not in use.

* * * * *